United States Patent
Moody

Patent Number: 5,125,196
Date of Patent: Jun. 30, 1992

[54] DOCK SEAL HEADER CONSTRUCTION

[75] Inventor: Ralph W. Moody, New Berlin, Wis.

[73] Assignee: Kelley Company Inc., Milwaukee, Wis.

[21] Appl. No.: 693,684

[22] Filed: Apr. 30, 1991

[51] Int. Cl.$^5$ .................... E04H 9/14; E04H 14/00
[52] U.S. Cl. .................................................. 52/173 DS
[58] Field of Search ............... 52/173 DS; 160/232, 160/236, 133

[56] References Cited

U.S. PATENT DOCUMENTS

| | | | |
|---|---|---|---|
| D. 310,125 | 8/1990 | Moore | D25/35 |
| 3,613,324 | 10/1971 | Conger | 52/173 DS |
| 4,062,157 | 12/1977 | Potthoff | 52/173 DS |
| 4,405,008 | 9/1983 | Hazlett | 160/232 |
| 4,821,468 | 4/1989 | Moore | 52/2 |
| 4,916,870 | 4/1990 | Moore | 52/2 |

OTHER PUBLICATIONS

Kelley Door Systems Division, DSH Series Dock Seals all Models, Installation Instructions, Apr. 1988.

Primary Examiner—John E. Murtagh
Attorney, Agent, or Firm—Andrus, Sceales, Starke & Sawall

[57] ABSTRACT

A dock seal header to be secured over a doorway in a loading dock. The header includes a panel or sheet of flexible material having an upper edge which is secured to the dock above the doorway. The header extends down to partially enclose the upper end of the doorway. A plurality of horizontal slabs or bars of a compressible material, such as foam plastic, are mounted in vertically spaced relation to the panel. A cable and pulley system is attached to the lower edge of the panel. The panel can be pulled up to a generally curved configuration through the cable system and is adapted to drape against the top of a truck parked in front of the loading dock. The side edges of the header panel are connected to the header pad cover by releasable fasteners, such as a hook and loop arrangement. As the panel is pulled upwardly, the fasteners will release and as the panel lowers, the fasteners will automatically re-engage.

14 Claims, 2 Drawing Sheets

DOCK SEAL HEADER CONSTRUCTION

BACKGROUND OF THE INVENTION

Dock seals are commonly used in association with loading docks to provide a seal between the end of a truck body parked in front of the loading dock and the dock. The use of a dock seal is particularly important when a loading operation is carried out at a cold storage warehouse to prevent warmer ambient air from entering the warehouse. Conversely, in cold weather climates it is desirable to provide a seal between the truck body and the dock to prevent the colder ambient air from entering the warehouse.

The conventional dock seal includes a pair of resilient side pads, commonly made of foam plastic material, which are mounted to the jambs along side the doorway on the loading dock. In addition, a header is mounted along the upper edge of the doorway and connects the upper ends of the two side pads. In order to accommodate truck bodies of varying height, the lower edge of the header extends a substantial distance beneath the upper end of the doorway. As the truck backs toward the loading dock, the end of the truck body will engage the header, pressing the header rearwardly to provide a seal between the header and the top surface of the truck body.

One common form of dock seal header is a flexible curtain or sheet formed of reinforced plastic or rubber coated fabric material. Headers of this type have very little insulating value, and as the truck body engages the flexible sheet and the header rides along the truck body, there is considerable abrasion of the header.

Inflatable dock seal headers have also been proposed, as disclosed in U.S. Pat. No. 4,821,468. However, headers of this type normally require a built-in blower for inflation. As a further problem, inflatable headers are frequently ruptured, thereby destroying the compressible nature of the header.

It has also been proposed to utilize foam plastic slabs as the header. However, a foam plastic slab is also subjected to abrasion as the truck body engages the header and the header rides against the truck body. Moreover, a thick foam slab lacks flexibility, so that the slab tends to pivot inwardly when engaged by the truck body, with the result that there is limited surface contact between the slab and the upper surface of the truck body.

SUMMARY OF THE INVENTION

The invention is directed to an improved dock seal header that can be manually raised and lowered, and provides a positive seal against the rear and upper surface of the truck body.

In accordance with the invention, the header includes a flexible sheet or panel, preferably formed of plastic material, having its upper edge secured to the loading dock above the doorway. The panel is formed with a series of spaced, horizontal, elongated pockets or compartments which contain a compressible material, such as foam plastic bars.

The lower end of the panel is weighted, and cables are attached to the lower end and are trained over a series of pulleys that are attached to the dock. Through manual pulling on the cables, the panel can be pulled upwardly into a generally curved configuration which is adapted to drape onto the rear and upper surface of the truck body.

As a feature of the invention, the side edges of the header panel are connected to the dock seal pads which are located along the jambs of the doorway by releasable fasteners which can take the form of hook and loop fasteners commonly sold under the Velcro trade name. As the header is pulled upwardly, the fasteners will be released, and when the header is lowered the fasteners will automatically be re-engaged.

The dock seal header of the invention is of simple and inexpensive construction, and can be manually operated and requires no auxiliary power source.

Due to the use of the spaced foam plastic bars, the panel will readily move to a curved configuration and will hug the rear and upper surface of the truck body. The compressive nature of the foam provides a positive weather seal to the truck body.

In use, the header can be pulled upwardly before the truck backs toward the dock and then lowered down onto the truck body. This eliminates any possible abrasion to the header caused by the header riding against the truck body as the truck moves toward the dock.

The header can be designed to hang downward a substantial distance beneath the top of the doorway, so it can readily accommodate trucks of varying heights.

Other objects and advantages will appear in the course of the following description.

DESCRIPTION OF THE DRAWINGS

The drawings illustrate the best mode presently contemplated for carrying out the invention. In the drawings.

DESCRIPTION OF THE ILLUSTRATED EMBODIMENT

Figure 1:
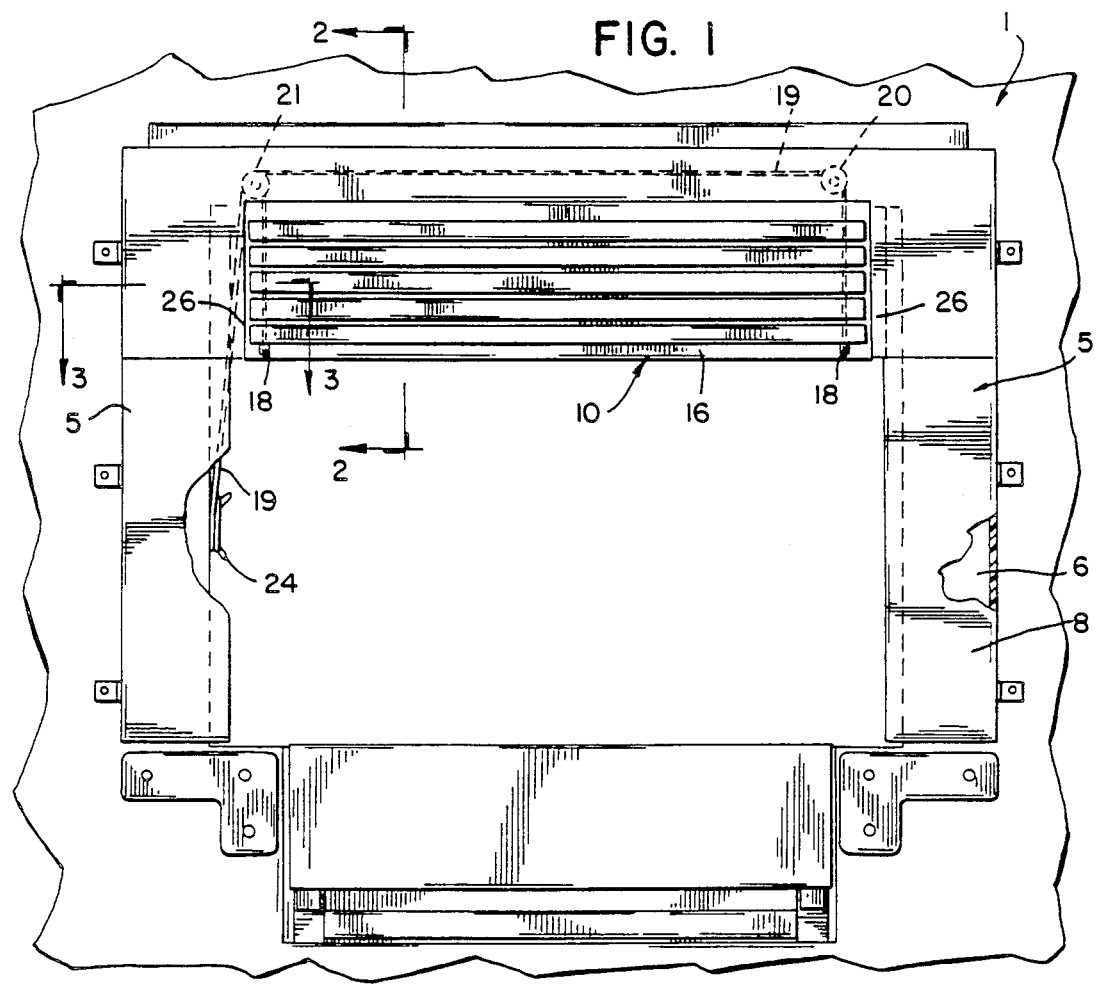
FIG. 1 is a plan view of a loading dock, incorporating the dock seal header of the invention.

FIG. 1 illustrates a loading dock 1 having a doorway 2 that is defined by a pair of jambs 3 and a header 4. The doorway is normally enclosed by an overhead door (not shown).

A pair of side dock seals 5 are mounted to the jambs 3 of the loading dock. The seals 5 can be of various types of construction, and as illustrated, comprise foam plastic pads 6 which are secured to a supporting plate or board 7 that is attached to the door jam 3. A protective cover, which can take the form of a plastic material 8, encloses each foam pad 6.

The header seal 10 of the invention is secured to the header 4 of the loading dock and extends over the upper ends of the side seals 5. The header seal 10, as illustrated in FIG. 2, includes a flexible sheet or panel 11, preferably formed of reinforced plastic material, and the upper edge of the panel is secured to a board or support 12 which is mounted to the header 4 of the loading dock.

Figure 2:
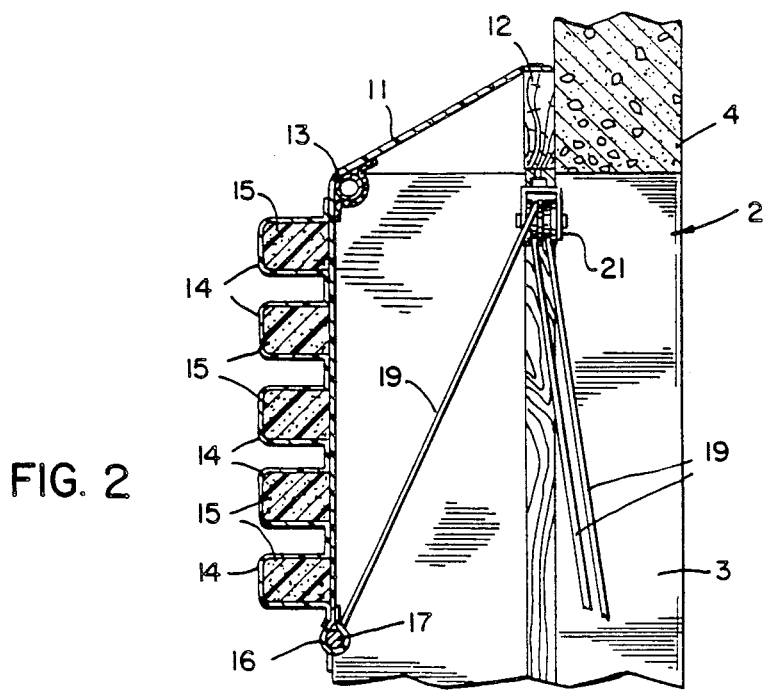
FIG. 2 is a section taken along line 2—2 of FIG. 1.

As illustrated in FIG. 2, panel 11 extends downwardly from the support 12 and passes over a tubular member 13, and then hangs down a substantial distance beneath the door header 4. The vertical portion of panel 11 is formed with a plurality of horizontal spaced compartments 14 which extend substantially the entire width of the header, and each compartment contains a bar or slab 15 of a compressible material, preferably foam plastic.

The foam plastic bars 15, which can be formed of polyurethane foam, are preferably a medium or low density foam which is readily compressible but will retain their integrity of shape.

The portions of panel 11 defining the compartments 14 can be formed with suitable vent holes (not shown) which act to release or vent air from the foam bars 15 when the bars are compressed due to impact from a truck body, thus preventing possible rupture of the header material.

The lower edge of panel 11 is provided with a hem 16 which contains a weighted material that can take the form of a weighted rope 17. The weight 17 aids in returning the panel to the vertical position after the truck has pulled away from the loading dock and maintains the panel in a generally vertical attitude.

Figure 4:
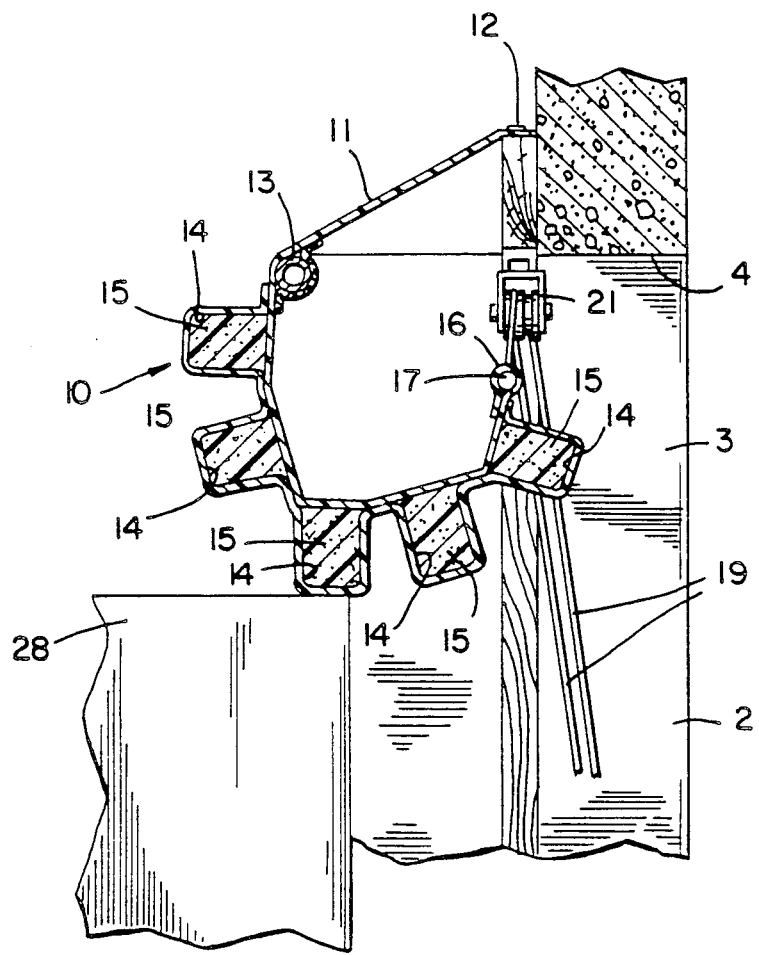
FIG. 4 is a view similar to FIG. 2, showing the dock seal header in an elevated position and in engagement with a truck body.

The panel can be pulled upwardly from the vertical position, as shown in FIG. 2, to an upper rolled or folded position, as shown in FIG. 4, by a cable and pulley arrangement. Eyes 18 are formed in the lower corners of the panel, and the ends of a rope 19 are secured to eyes 18. One end of the rope 19 extends upwardly and passes through a pulley 20, and then through a double pulley 21. The rope then extends downwardly along the door jamb and then extends back around the double pulley 21 and is secured to the eye 18 at the opposite end of the header. The portion of the rope located along the door jamb can be tied around a cleat 24 mounted on the jamb to hold the header in any desired position.

Figure 3:
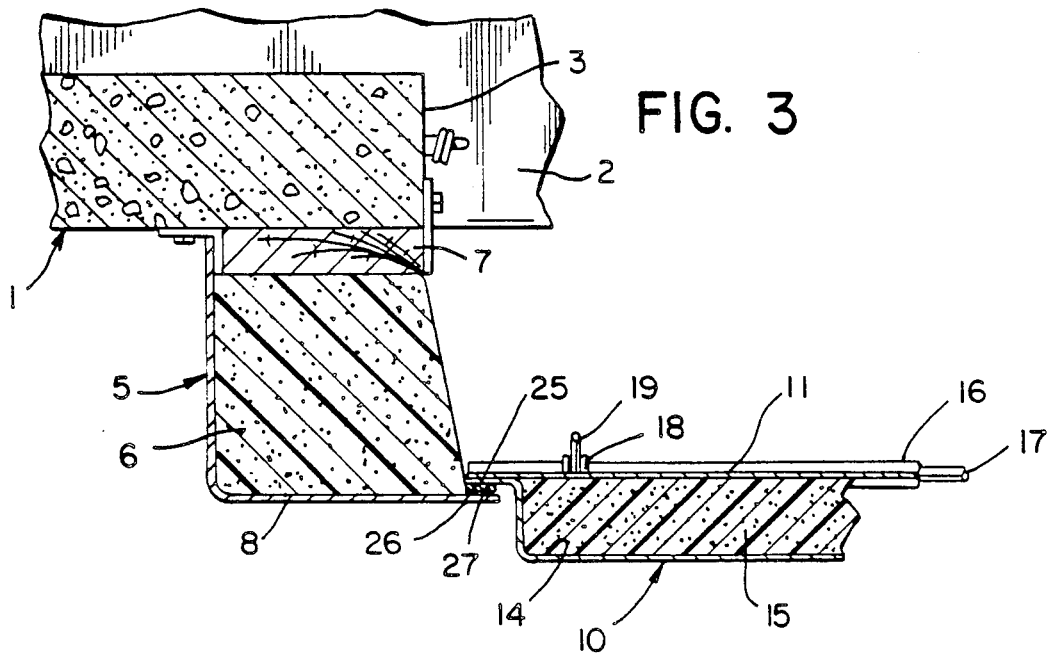
FIG. 3 is a section taken along line 3—3 of FIG. 1.

The side edges of header panel 11 are connected to the pad cover 8 by a releasable fastener arrangement. As best illustrated in FIG. 3, each side edge 25 of the panel is connected to the projecting flange 26 of cover 8 by a releasable fastener 27, which preferably takes the form of hook and loop elements sold under the Velcro trade name. When the header is pulled up to the position shown in FIG. 4, fasteners 27 will automatically release, and when the header is returned to the pendant position, as seen in FIG. 2, fastener 27 will automatically re-engage to provide a weatherseal.

In use, the header can be raised to an elevated position through pulling on rope 19 before the truck backs to the loading dock. With the truck in position in front of the dock, the rope 19 is then released, causing the header to be lowered into engagement with the top surface of the truck body 28, as shown in FIG. 4. Due to the segmented foam bars 15 and the compressible nature of the foam, a substantial area of contact will be obtained between the header and the truck body to thereby provide a positive weather seal. When the truck pulls away from the dock, the header will return to a vertical position and the weighted rope 17 will aid in re-engaging the fasteners 27. Alternately, activation of the header can be effected after the truck is in position at the dock.

By raising the header before the truck pulls to the dock, abrasion of the header by the truck body is eliminated.

The header is operated manually, and thereby provides a substantial cost advantage over a header assembly which requires an auxiliary power source.

As the header extends downwardly a substantial distance beneath the doorway header, it is able to accommodate trucks of varying heights.

Various modes of carrying out the invention are contemplated as being within the scope of the following claims particularly pointing out and distinctly claiming the subject matter which is regarded as the invention.

I claim:

1. A dock seal header to be secured over a doorway in a loading dock, comprising a panel of flexible material having an upper edge secured to the dock above the doorway, said panel extending down to partially enclose said doorway, a plurality of separate elongated horizontal bars mounted in vertically spaced relation to a surface of said panel, said bars being formed of a compressible material, and means for moving the panel between an upper position where the panel has a generally curved configuration and a lower position where at least one of said bars is disposed to drape onto the upper surface of a vehicle parked in front of the loading dock.

2. The header of claim 1, wherein said compressible material comprises foam plastic.

3. The header of claim 1, wherein said bars extend substantially the complete width of said panel.

4. The header of claim 1, and including releasable fastening means disposed on each side edge of the panel for releasably connecting each side edge to said dock, said releasable fastening means being constructed and arranged such that movement of said panel to said upper position will release said fastening means and movement of said panel to the lower position will automatically re-engage said fastening means.

5. The header of claim 1, wherein said panel is provided with a plurality of elongated horizontal spaced compartments and said bars are disposed within said compartments.

6. In combination, a loading dock having a doorway bordered by a doorway header and a pair of jambs, a side seal attached to each jamb, each side seal extending substantially the full height of the doorway, and a header seal secured to the door header and enclosing the upper ends of said side seals, said header seal comprising a flexible sheet of material having an upper edge secured to the doorway header and extending downwardly to partially enclose said doorway, said sheet including a plurality of separate vertically spaced horizontal compartments that extend substantially the full width of said sheet, a compressible material disposed within each compartment, and means for moving the sheet between an upper position and where the sheet has a generally curved configuration and a lower position where at least one of said compartments is disposed to drape onto the upper surface of a vehicle parked in front of the dock.

7. The combination of claim 6, and including releasable fastening means interconnecting the side edges of the sheet and said side seals, said releasable fastening means being constructed and arranged to be released as said sheet is pulled upwardly to said upper position and to be automatically re-engaged when said sheet is lowered to said lower position.

8. The combination of claim 6, wherein said compressible material comprises foam plastic.

9. The combination of claim 6, wherein each compartment is generally rectangular in cross section.

10. The combination of claim 6, wherein said means for moving the sheet upward comprises a cable attached to said lower end.

11. In combination, a loading dock having doorway bordered by a doorway header and a pair of jambs, a side seal attached to each jam, each side seal extending substantially the full height of the doorway, and a header seal secured to the doorway header and enclosing the upper ends of said side seals, said header seal comprising a flexible sheet of material having an upper edge secured to the doorway header and extending downwardly to partially enclose said doorway, said sheet including a plurality of separate vertically spaced horizontal compartments that extend substantially the full width of said sheet, a slab of compressible foam plastic material disposed within each compartment, means for moving the sheet between an upper position where the sheet has a generally curved configuration and a lower position where at least one of the compartments is disposed to drape onto the upper surface of a vehicle parked in front of the dock, releasable fastening means interconnecting the side edges of said sheet with the respective side seals, said releasable fastening means being constructed and arranged to be released as said sheet is moved to the upper position and to be automatically reengaged when the sheet is moved to the lower position, and weight means connected to the lower edge of the sheet.

12. The combination of claim 11, wherein said releasable fastening means comprises a hook element and a loop element, one of said elements being connected to said side edge and the other of said elements being connected to said side seal.

13. The combination of claim 11, wherein said weight means comprises an elongated weight extending substantially the width the said sheet.

14. The combination of claim 13, wherein the lower edge of said sheet is provided with a tubular hem and said weight is disposed in said hem.

* * * * *

UNITED STATES PATENT AND TRADEMARK OFFICE
CERTIFICATE OF CORRECTION

PATENT NO.  : 5,125,196
DATED       : June 30, 1992
INVENTOR(S) : RALPH W. MOODY It is certified that error appears in the above-identified patent and that said Letters Patent is hereby corrected as shown below:

Col. 4, Line 66, CLAIM 11, After "having" insert --a--; Col. 4, Line 68, CLAIM 11, Delete "jam" and substitute therefor --jamb--; Col. 6, Line 13, CLAIM 13, Delete "the", second occurrence, and substitute therefor --of--.

Signed and Sealed this

Eleventh Day of January, 1994

Attest:

BRUCE LEHMAN

Attesting Officer

Commissioner of Patents and Trademarks